United States Patent [19]

Feng

[11] Patent Number: 4,569,687
[45] Date of Patent: Feb. 11, 1986

[54] INERTIAL AIR CLEANER

[76] Inventor: You-Ching Feng, 3F., No. 7, Lane 103, Shi Jou St., Taipei, Taiwan

[21] Appl. No.: 676,641

[22] Filed: Nov. 30, 1984

[51] Int. Cl.⁴ .............................................. B01D 45/12
[52] U.S. Cl. ........................................ 55/345; 55/457; 55/DIG. 14
[58] Field of Search ............................... 55/319–321, 55/457, 458, 470, 346, 456, 347, 345, DIG. 14

[56] References Cited

U.S. PATENT DOCUMENTS

| | | | |
|---|---|---|---|
| 2,413,324 | 12/1946 | Holzwarth | 55/457 X |
| 2,487,633 | 11/1949 | Breslove | 55/457 X |
| 3,902,876 | 9/1975 | Moere et al. | 55/457 X |
| 4,173,458 | 11/1979 | Stiles | 55/457 X |
| 4,179,273 | 12/1979 | Montusi | 55/457 |
| 4,187,652 | 2/1980 | Hodgson | 55/457 X |

Primary Examiner—Charles Hart
Attorney, Agent, or Firm—Balogh, Osann, Kramer, Dvorak, Genova & Traub

[57] ABSTRACT

An inertial air cleaner characterized by comprising an intake pipe, a first air chamber, a second air chamber, a third air chamber, a first funnel-shaped air disturber, a second funnel-shaped air disturber, a first dust chamber, a second dust chamber and an exhaust pipe, and being capable of making the intake smoke or air with carbon rotate therein, and effectively removing the carbon particles by centrifugal force without need of any filtering materials.

8 Claims, 4 Drawing Figures

INERTIAL AIR CLEANER

BACKGROUND OF THE INVENTION

This invention relates to an air cleaner especially one which can clean the contaminated air mechanically without need of any water, chemical or filtering material. This practical air cleaner can quickly remove the carbon particles from the smoke and greatly improve the pollution resulted from the burning of fuel to power motor vehicles and from industrial processes.

In addition to being easy to remove the carbon particles deposited, it is very simple to install and maintain without need to replenish water or to replace filtering materials. The inertial air cleaner can remove dust and particles of smoke more effectively than any conventional air cleaner of its kind. It is also compact, durable and low in cost.

DETAILED DESCRIPTION OF THE PREFERRED EMBODIMENT

Figure 1:
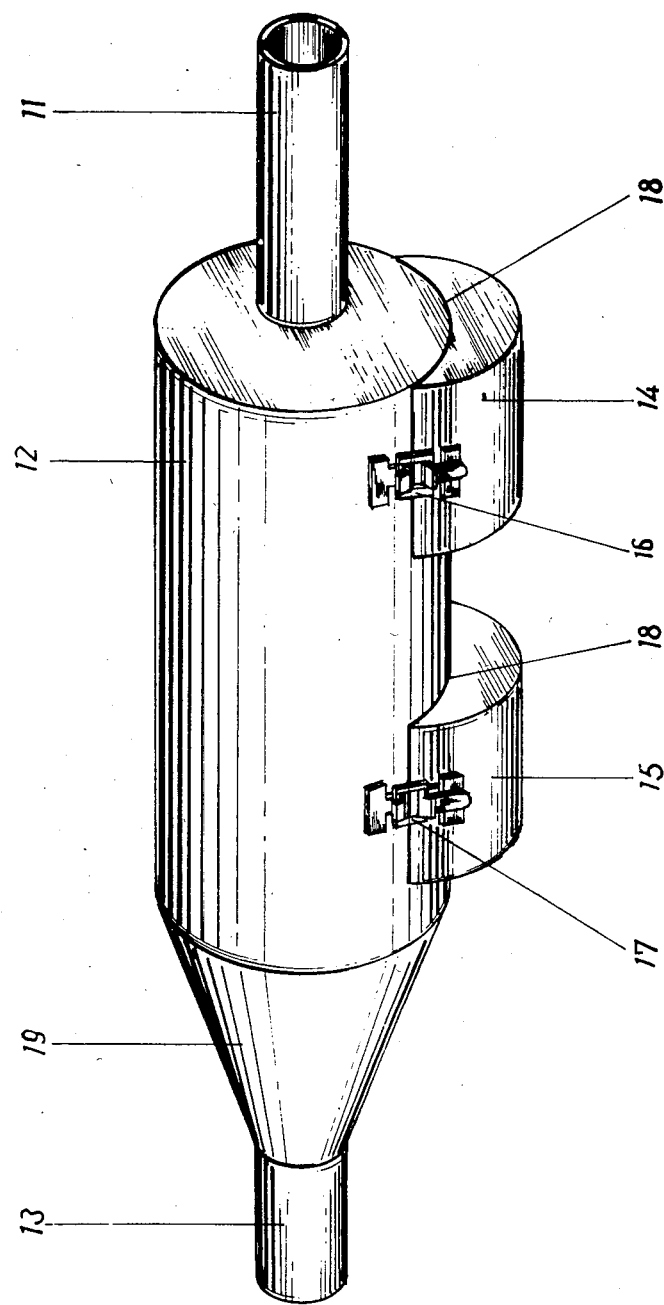
FIG. 1 is a vertical view of the inertial air cleaner of this invention.

As shown in FIG. 1 the air cleaner in the form of a cylinder comprises an intake pipe 11 to be connected to industrial exhaust orifice or vehicle exhaust pipe, a cylinder 12, a first dust chamber 14 and a second dust chamber 15 attached to the bottom of the cylinder 12 by means of fasteners 16, 17 and sealed with packings 18 and opened to the cylinder 12, a second air disturber 19 in the form of a funnel, and an exhaust pipe 13 at the rear end of the cylinder 12.

Figure 2:
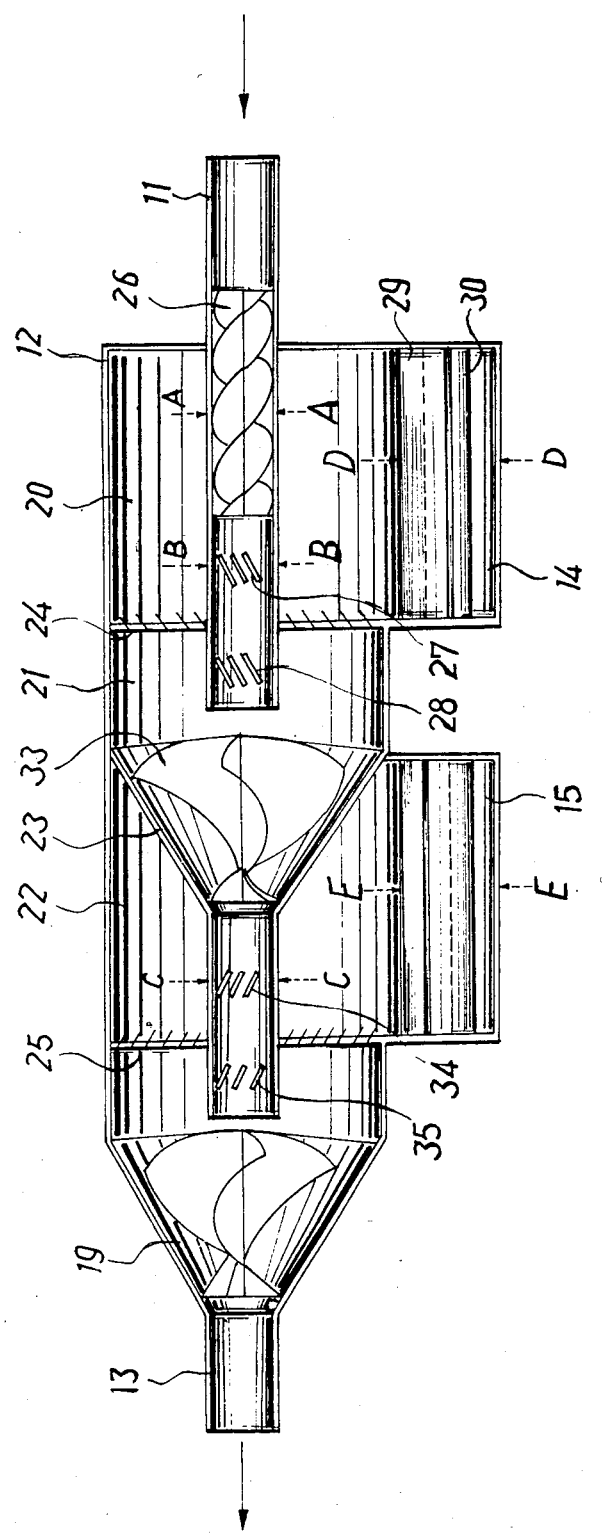
FIG. 2 is a longitudinal section of the inertial air cleaner of FIG. 1.

As shown in FIG. 2, the cylinder 12 consists of a first air chamber 20 opened to the first dust chamber 14, a second air chamber 21 opened to the second dust chamber 15, a third air chamber 22, a part of the intake pipe 11 extending through the first air chamber 20 to the second air chamber 21, a first partition 24 between the first air chamber 20 and the second air chamber 21, a first funnel-shaped air disturber 23 between the second air chamber 21 and the third air chamber 22, and a second partition 25 between the third air chamber 22 and the second air disturber 19.

Figure 3:
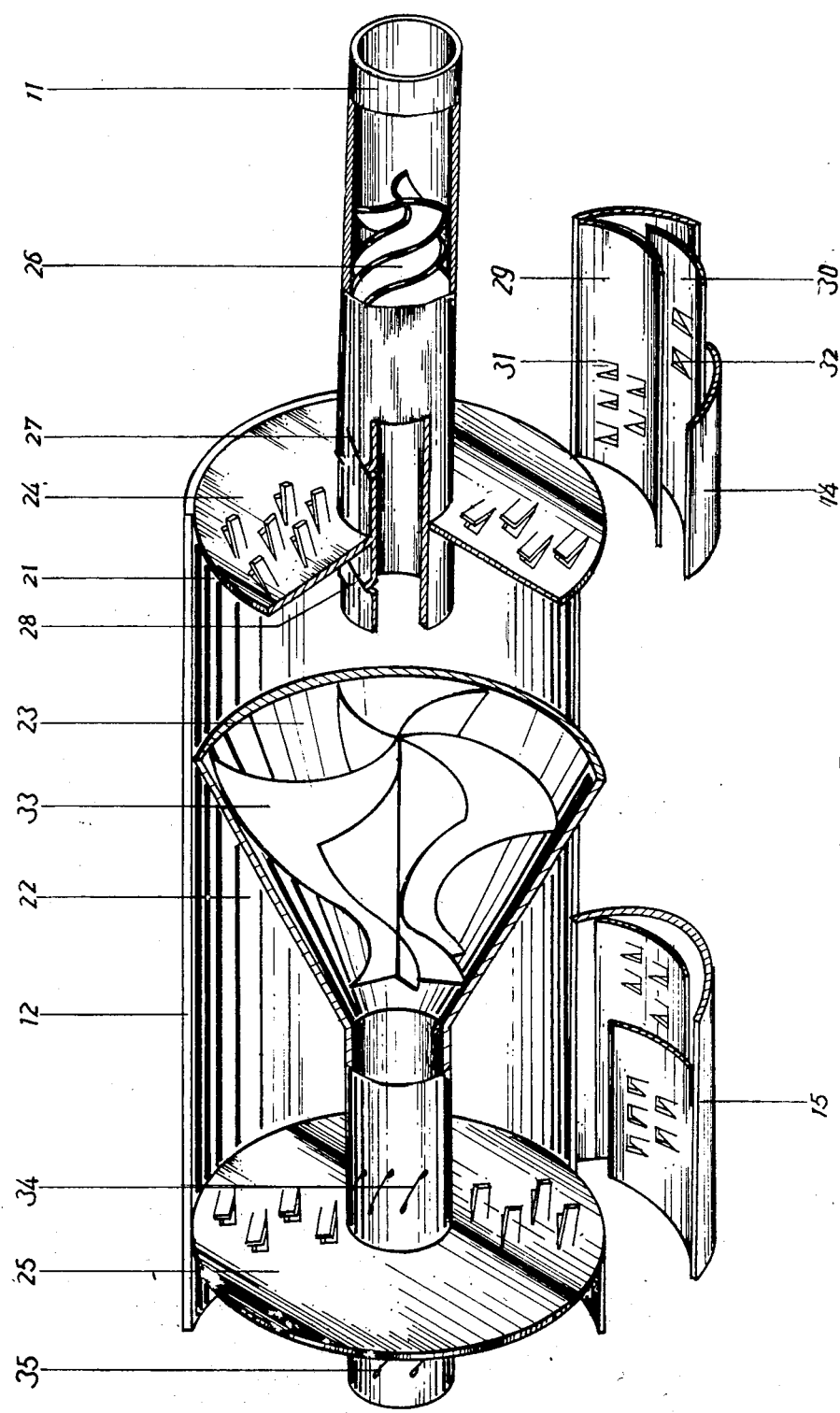
FIG. 3 is a partial cutaway of the said air cleaner.
Figure 4:
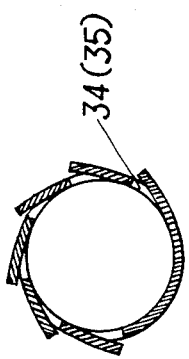
FIG. 4 is a cross section of the parts shown in FIG. 2.
Figure 4:
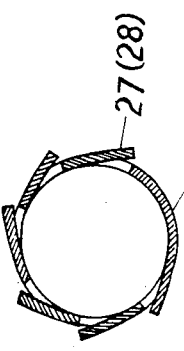
Figure 4:
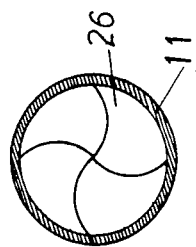
Figure 4:
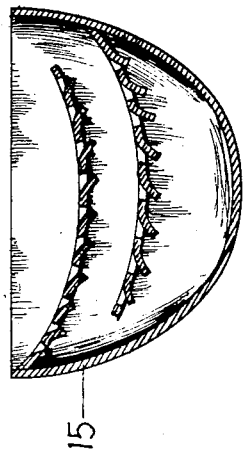
Figure 4:
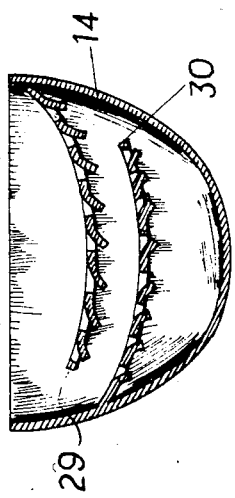

As shown in FIG. 2 and FIG. 3, the intake pipe 11 has four spiral blades 26 in itself. The four blades 26 are made in the form of right-handed spiral around the center of the intake pipe 11. The spiral blades 26 of which a cross section is shown in FIG. 4 A—A is designed to form a right-handed spiral stream of air in the intake pipe 11 so as to produce centrifugal force. A plurality of air vents 27 opened clockwise toward the first partition 24 is provided in the wall of the intake pipe 11 between the rear end of the spiral blades 26 and the first partition 24. A plurality of similar air vents 28 is provided in the wall of the end section of the intake pipe 11 extending into the second air chamber 21. (A cross section of the intake pipe 11 is shown in FIG. 4 B—B.)

The first partition 24 between the first air chamber 20 and the second air chamber 21 joins the inside of the cylinder 12 at the periphery, and the intake pipe 11 at the center, and has a lot of air vents opened clockwise toward the first air chamber 20 and arranged in indented rows as shown in FIG. 3 (in which only a few vents of the partition 24 are shown).

The first dust chamber 14 attached to the bottom of the first air chamber 20 as shown in FIG. 3 has two curved plates 29, 30 mounted respectively on the internal wall of the dust chamber 14 at one side and having a proper space between them. (A cross section is shown in FIG. 4 D—D.) The curved plates 29, 30 have air vents 31, 32 opened to the bottom of the dust chamber 14 in different directions and arranged in indented rows. (As shown in FIG. 3, the air vents 31 of the curved plate 29 and the air vents 32 of the curved plate 30 are opened in different directions.)

The first funnel-shaped air disturber 23 between the second air chamber 21 and the third air chamber 22 as shown in FIG. 2 and FIG. 3 has a plurality of S disturbing blades 33. The front part of each of the S blades 33 curves clockwise from the axis of the cylinder to the internal wall of the disturber 23 and joins there. The rear part of the same at the taper end curves counter-clockwise from the axis to the internal wall of the disturber 23 and joins there.

The second dust chamber 15 attached to the third air chamber 22 is same in construction but the two curved plates are mounted on the internal wall of the dust chamber 15 at the side different from those of the corresponding curved plates of the first dust chamber 14 and the air vents in the curved plates are opened in the directions different from those of the corresponding curved plates of the first dust chamber 14. A cross section of the second dust chamber 15 is shown in FIG. 4 E—E.

The said first air disturber 23 has a tubular section at the truncated end extending to the front of the second air disturber 19. The front end of the first air disturber 23 serves as a separator of the third air chamber 22 from the second air chamber 21. The rear end section of the first air disturber 23 has air vents 34, 35 before and after the second partition 25 opened counter-clockwise to the second partition 25. (A cross section is shown in FIG. 4 C—C.)

Since the said air vents 27, 28, 34, 35 are designed to create a whirling air stream and to prevent it from rushing directly into the dust chambers 14, 15, they are opened to the walls of the cylinder 12, not to the dust chambers 14, 15 as shown in FIG. 4 B—B and C—C.

As shown in FIG. 2 and FIG. 3, the second partition 25 is same in construction as the first partition 24 but the air vents of the second partition 25 are opened to the third air chamber 22 and arranged in indented rows.

As shown in FIG. 2, the second disturber 19 is similar in construction to the first disturber 23—all in the form of a funnel, but has disturbing blades of which the front part curves counter-clockwise toward the funnel-shaped wall and joins there, and the rear part becomes flat and connected to the exhaust pipe 13.

When the smoke or air with carbon comes from an exhaust pipe into the intake pipe 11 of this invention, it revolves clockwise along the spiral blades 26 and by centrifugal force, most of the smoke shoots out from the vents and swings clockwise around the intake pipe 11 in the first chamber 20. At this time, the lighter air (clean air) is thrusted through the air vents 28 of the first partition 24 into the second air chamber 21. The air with carbon (the heavier air) remains revolving in the chamber 20 until the carbon particles become larger and heavier and fall into the first dust chamber 14 where they are deposited on the curved plates 29, 30.

At this time, some of smoke revolving in the intake pipe 11 flows directly through the air vents 28 into the second air chamber 21 and continues to revolve therein while the other shoots out onto the disturbing blades 33 in the funnel-shaped disturber 23. Since the disturbing blades 33 are curved clockwise, the smoke revolving clockwise reacts to the funnel-shaped wall that constrains motion and is impelled to return through the air vents 28 of the first partition 24 into the first air chamber 20. With the confronting and friction of the backflowing smoke with the said lighter air, the carbon particles become heavier and are thrown out into the first dust chamber 14 by centrifugal force.

The air with less carbon in the first disturber 23 flows along the S disturbing blades 33 out of the truncated end of the funnel-shaped disturber 23. As constrained by the end part of the disturbing blades 33, the air flow changes direction from clockwise to counter-clockwise. As mentioned above the air vents 34 and the second partition 25 function to make the air with more carbon enter the second dust chamber 15 and rotate counter-clockwise therein. The rest of smoke reacts to the wall of the second disturber 19 behind the second partition 25 and is impelled to return to the third air chamber 22 and deposited in the second dust chamber 15. The clean air in the third air chamber 22 and in the second disturber 19 is impelled out of the exhaust pipe 13. Thus the object to remove carbon particles from the smoke is attained.

In use, it needs not to replace any parts but to clean the dust chambers periodically.

The size of the cylinder and the number of air chambers, disturbers and dust chambers can be increased to meet the need of cleaning greater amount of smoke exhausted from various factories and motor vehicles, especially from Diesel engines.

I claim:

1. An inertial air cleaner comprising an intake pipe, a cylinder, a plurality of curved dust chambers attached to the cylinder by means of fasteners and sealed with packings, and an exhaust pipe; the said cylinder consisting of at least one first air chamber opened to the first dust chamber, one second air chamber separated from the first air chamber by a first partition, one first funnel-shaped air disturber, one third air chamber situated between the second air chamber and the first air disturber and opened to the second dust chamber separated from the third air chamber by the second partition, and one second funnel-shaped air disturber connected to the exhaust pipe.

2. An inertial air cleaner according to claim 1 wherein the intake pipe extends through the first air chamber into the second air chamber and has four clockwise spiral blades in it and a plurality of vents opened clockwise and respectively to the first air chamber and the second air chamber.

3. An inertial air cleaner according to claim 1 wherein the first partition covering the whole cross section of the cylinder has a plurality of air vents opened clockwise to the first air chamber and arranged in indented rows.

4. An inertial air cleaner according to claim 1 wherein the first dust chamber under the first air chamber has two curved plates mounted respectively on the internal wall at one side and with proper space and having air vents opened to the bottom in different directions and arranged in indented rows.

5. An inertial air cleaner according to claim 1 wherein the first funnel-shaped air disturber has a plurality of S disturbing blades of which the front part curves clockwise from the axis of the cylinder to the internal wall and joins there, and the rear part curves counter-clockwise from the axis to the internal wall and joins there.

6. An inertial air cleaner according to claim 1 wherein the tubular end section of the first disturber extending through the second partition to the front of the second air disturber has a plurality of air vents opened counter-clockwise toward the second partition.

7. An inertial air cleaner according to claim 1 wherein the second partition covering the whole cross section of the cylinder has a plurality of air vents opened counter-clockwise to the third air chamber and arranged in indented rows.

8. An inertial air cleaner according to claim 1 wherein the second funnel-shaped air disturber has a plurality of disturbing blades of which the front part curves from the axis of the cylinder to the internal wall and joins there, and the rear part becomes flat and connected to the exhaust pipe.

* * * * *